(12) United States Patent
Li et al.

(10) Patent No.: US 11,858,462 B2
(45) Date of Patent: Jan. 2, 2024

(54) ELECTRIC PEDAL FOR AUTOMOBILE

(71) Applicant: Shanghai Essenway Technology Development Co., Ltd., Shanghai (CN)

(72) Inventors: Jiancheng Li, Shanghai (CN); Guilan Zhou, Shanghai (CN)

(73) Assignee: Shanghai Essenway Technology Development Co., Ltd., Shanghai (CN)

( * ) Notice: Subject to any disclaimer, the term of this patent is extended or adjusted under 35 U.S.C. 154(b) by 0 days.

(21) Appl. No.: 18/344,776

(22) Filed: Jun. 29, 2023

(65) Prior Publication Data

US 2023/0356660 A1    Nov. 9, 2023

Related U.S. Application Data

(63) Continuation of application No. PCT/CN2022/092242, filed on May 11, 2022.

(30) Foreign Application Priority Data

May 5, 2022  (CN) .......................... 202210478403.1
May 5, 2022  (CN) .......................... 202221042429.3

(51) Int. Cl.
*B60R 3/02*  (2006.01)

(52) U.S. Cl.
CPC ..................... *B60R 3/02* (2013.01)

(58) Field of Classification Search
CPC .................... B60R 3/02; B60R 3/002
See application file for complete search history.

(56) References Cited

U.S. PATENT DOCUMENTS

| 10,773,649 | B2 * | 9/2020 | Ye ............................ B60R 3/02 |
| 2016/0023609 | A1 * | 1/2016 | Watson .................... B60R 3/002 |
| | | | 280/166 |
| 2018/0001825 | A1 * | 1/2018 | Long ....................... B60R 3/002 |
| 2019/0084482 | A1 * | 3/2019 | Long ....................... B60R 3/002 |
| 2019/0118720 | A1 * | 4/2019 | Otacioglu ............... B60R 3/002 |
| 2020/0139892 | A1 * | 5/2020 | Ye ........................... B60R 3/002 |
| 2022/0371516 | A1 * | 11/2022 | Ye ........................... B60Q 1/323 |

FOREIGN PATENT DOCUMENTS

| CN | 107226031 A | 10/2017 |
| CN | 109383390 A | 2/2019 |
| CN | 209454651 U | 10/2019 |
| CN | 210258230 U | 4/2020 |
| JP | 2018176799 A | 11/2018 |

\* cited by examiner

*Primary Examiner* — Bryan A Evans
(74) *Attorney, Agent, or Firm* — MEI & MARK LLP; Manni Li

(57) ABSTRACT

An electric pedal for an automobile comprises a driving support, a driven support, and a pedal. The driving support comprises a first automobile connecting rod, a driving motor, a second automobile connecting rod, a gear box, and a rotating mechanism. The first automobile connecting rod, the driving motor, and the second automobile connecting rod are separately fixed to the automobile to which the electric pedal is mounted, and the driven support comprises a driven automobile fixing plate and a driven rotating mechanism. The electric pedal for an automobile can be switched into a fixed side pedal, and in this case, the driving motor needs to be stopped, or the driving motor or the gear box fails.

7 Claims, 5 Drawing Sheets

ELECTRIC PEDAL FOR AUTOMOBILE

CROSS-REFERENCE TO RELATED APPLICATIONS

The subject application is a continuation of PCT/CN2022/092242 filed on May 11, 2022, which in turn claims priority on Chinese Patent Application Nos. CN202210478403.1 and CN202221042429.3, both filed on May 5, 2022 in China. The contents and subject matters of the PCT international stage application and Chinese priority applications are incorporated herein by reference.

TECHNICAL FIELD

The present invention relates to automobile pedals, and in particular, an electric pedal for an automobile.

BACKGROUND ART

At present, there are two types of electric pedals for automobiles in the market.

The first type of the electric pedals for automobiles horizontally extend in an oblique downward direction on an outer side of an automobile body, and such a retraction-extension type pedal has the following defects: the pedal structure is complex, and machining and manufacturing cost is high; torque output loss of a pedal retracting and extension electric motor is relatively large, a larger electric motor is needed, and cost control is not facilitated; and the electric pedal is electrically controlled and cannot be freely switched into a fixed side pedal state.

The second type of the electric pedals for automobiles rotate and extend forwards or backwards of the automobiles, and such a retraction-extension type pedal has the following defects: the pedal structure is simple, and stability of mechanism operation is relatively poor; torque output loss of a pedal retracting and extension electric motor is relatively small, and power of the electric motor is relatively small; and the larger an inclination angle of a rotating rod is, the larger lever force applied to a bottom end of a driving support and a bottom end of a driven support is, and the larger influence of a weight borne by the pedal is, such that weight bearing of the pedal cannot be too heavy, and the electric pedal is electrically controlled and cannot be freely switched into a fixed side pedal.

U.S. Pat. No. 10,773,649B2 discloses the second type of the electric pedals for an automobile as mentioned above with the aforementioned defects. Especially, the electric pedal is electrically controlled and cannot be freely switched into the fixed side pedal. In particular, control over the pedal fails when electrical control fails.

SUMMARY OF INVENTION

An objective of the present invention is to provide an electric pedal for an automobile, which solves the technical problems existing in the above-mentioned second type of electric pedal for an automobile (rotation extension type pedal). The electric pedal for an automobile of the present invention has the advantages of being improved in bearing weight, capable of being freely switched into a fixed side pedal, etc.

To achieve the above objective, the present invention provides the following technical solutions:

An electric pedal for an automobile comprises at least one driving support, at least one driven support, and a pedal.

The driving support comprises a first automobile connecting rod, a driving motor, a second automobile connecting rod, a gear box and a rotating mechanism, wherein the first automobile connecting rod, the driving motor, and the second automobile connecting rod are separately fixed to the automobile to which the electric pedal is mounted, the first automobile connecting rod and the second automobile connecting rod are separately and fixedly connected to the gear box, the gear box is connected to the driving motor, and the driving motor is fixed on the gear box. The rotating mechanism is connected to the gear box by means of a rotating rod, the rotating rod is arranged below the second automobile connecting rod, and the rotating mechanism is connected to the automobile pedal. The rotating mechanism comprises a lower supporting wall and an upper supporting wall, an angle between the lower supporting wall and a horizontal plane is 0 to 10°, the end, away from the rotating rod, of the rotating mechanism is provided with a connecting end surface, and an angle between the connecting end surface and a vertical plane is set to 0 to 5°, such that the automobile pedal tilts towards a top of an automobile roof by 0 to 5°. The connecting end surface is internally provided with a connecting column fixed to the automobile pedal in a matching manner, and the connecting column is vertically arranged in the connecting end surface. The end, away from the rotating mechanism, of the rotating rod is connected to the gear box by means of a driving shaft, a lower end of the rotating rod is provided with a rotating rod supporting arm, and the rotating rod supporting arm and the rotating rod are arranged in parallel. The front end of the rotating rod supporting arm is provided with a fixing arm perpendicular to the rotating rod, and one side of the rotating rod protrudes outwards and is fixedly connected to the rotating rod supporting arm by means of a fixing pin.

The driven support comprises a driven automobile fixing plate and a driven rotating mechanism, wherein one end of the driven automobile fixing plate is fixed to the automobile to which the electric pedal is mounted, and the other end of the driven automobile fixing plate is fixedly connected to a driven connecting member. The driven rotating mechanism is connected to the driven connecting member by means of a driven rotating rod, the driven rotating rod is arranged below the driven automobile fixing plate, and the driven rotating mechanism is connected to the automobile pedal. The driven rotating mechanism comprises a driven lower supporting wall and a driven upper supporting wall, and an angle between the driven upper supporting wall and a horizontal plane is set to 0 to 5° such that the automobile pedal tilts towards the top of the automobile roof by 0 to 5°. An angle between the driven lower supporting wall and the horizontal plane is 0 to 10°. The end, away from the driven rotating rod, of the driven rotating mechanism is provided with a driven connecting end surface, the driven connecting end surface is internally provided with a driven connecting column fixed to the automobile pedal in a matching manner, and the driven connecting column is vertically arranged in the driven connecting end surface. The end, away from the driven rotating mechanism, of the driven rotating rod is connected to the driven connecting member by means of a driven driving shaft. A lower end of the driven rotating rod is provided with a driven rotating rod supporting arm, and the driven rotating rod supporting arm and the driven rotating rod are arranged in parallel. An edge of the driven rotating rod supporting arm is provided with a driven fixing arm perpendicular to the driven rotating rod, and one side of the driven rotating rod protrudes outwards and is fixedly connected to the driven rotating rod supporting arm by means of a driven fixing pin.

According to the electric pedal for an automobile, the end, close to the rotating rod, of the rotating mechanism is provided with the upper supporting wall and the lower supporting wall, and the upper supporting wall and the lower supporting wall are arranged in parallel; and the upper supporting wall and the lower supporting wall form a rotating rod groove, a rotating rod rotating shaft is arranged in the rotating rod groove, and the rotating rod rotating shaft is connected to the rotating rod; and the end, close to the driven rotating rod, of the driven rotating mechanism is provided with the driven upper supporting wall and the driven lower supporting wall, and the driven upper supporting wall and the driven lower supporting wall are arranged in parallel. The driven upper supporting wall and the driven lower supporting wall form a driven rotating rod groove, a driven rotating rod rotating shaft is arranged in the driven rotating rod groove, and the driven rotating rod rotating shaft is connected to the driven rotating rod.

According to the electric pedal for an automobile of the present invention, the rotating rod is obliquely arranged downwards, and an angle between the rotating rod and the horizontal plane is 0 to 10°; and the driven rotating rod is obliquely arranged downwards, and an angle between the driven rotating rod and the horizontal plane is 0 to 10°.

According to the electric pedal for an automobile, the end, away from the rotating rod, of the rotating mechanism is provided with the connecting end surface, the connecting end surface is internally provided with the connecting column fixed to the automobile pedal in the matching manner, and the connecting column is vertically arranged in the connecting end surface; and the end, away from the driven rotating rod, of the driven rotating mechanism is provided with the driven connecting end surface, the driven connecting end surface is internally provided with the driven connecting column fixed to the automobile pedal in the matching manner, and the driven connecting column is vertically arranged on the driven connecting end surface.

According to the electric pedal for an automobile, the second automobile connecting rod is fixedly connected to the gear box by means of fixing rods, and at least two the fixing rods are arranged and parallel to each other; and the second automobile connecting rod is fixedly connected to a fixing plate and the fixing rods in a welded manner, and at least two the fixing rods are arranged and parallel to each other.

According to the electric pedal for an automobile, the driven automobile fixing plate is provided with the driven connecting members, the driven automobile fixing plate is fixedly connected to the driven connecting members in a welded manner, and at least two driven connecting members are arranged and parallel to each other.

According to the electric pedal for an automobile of the present invention, the electric pedal for an automobile may be switched into a fixed side pedal, and in this case, the driving motor needs to be stopped, or either the driving motor or the gear box fails.

Under the first situation when the rotating rod and the driven rotating rod rotate to enable the pedal to be in an extended state, first bolts reserved by the rotating rod on the driving support are rotated and taken down and aligned with first holes of the fixing rods, and then the rotating rod and the fixing rods are fixed by making the first bolts pass through the first holes.

Moreover, second bolts reserved by the driven rotating rod are rotated and taken down and aligned with third holes of the driven connecting members, and then the driven rotating rod and the driven connecting members are fixed by making the second bolts pass through the third holes.

Under the second situation when the rotating rod and the driven rotating rod rotate to enable the pedal to be in a retracted state, first bolts reserved by the rotating rod on the driving support are rotated and taken down and aligned with second holes of the fixing rods, and then the rotating rod and the fixing rods are fixed by making the first bolts pass through the second holes.

Moreover, second bolts reserved by the driven rotating rod are rotated and taken down and aligned with fourth holes of the driven connecting members, and then the driven rotating rod and the driven connecting members are fixed by making the second bolts pass through the fourth holes.

According to the electric pedal for an automobile of the present invention, the end, away from the gear box, of the driving shaft is provided with a limiting block and the rotating rod supporting arm, and the limiting block is arranged at the end, away from the gear box, of the rotating rod supporting arm; and the end, away from the driven connecting member, of the driven driving shaft is provided with a driven limiting block and a driven rotating rod supporting arm, and the driven limiting block is arranged at the end, away from the driven connecting member, of the driven rotating rod supporting arm.

According to the electric pedal for an automobile of the present invention, the rotating rod supporting arm is fixedly connected to the end, away from the second automobile connecting rod, of the rotating rod, and the rotating rod supporting arm and the rotating rod jointly rotate synchronously by taking the driving shaft as a rotating shaft; and the driven rotating rod supporting arm is fixedly connected to the end, away from the driven automobile fixing plate, of the driven rotating rod, and the driven rotating rod supporting arm and the driven rotating rod jointly rotate synchronously by taking the driven driving shaft as a rotating shaft.

According to the electric pedal for an automobile of the present invention, the first automobile connecting rod and the second automobile connecting rod are perpendicular to each other, the first automobile connecting rod is provided with a first connecting rod fixing hole, and the second automobile connecting rod is provided with two second connecting rod fixing holes; and the driven automobile fixing plate is provided with a driven automobile fixing plate fixing hole.

With the above technical solutions, the present invention has the following advantages:

1. The present invention may be switched into the fixed side pedal from the electric side pedal. Especially, when the driving motor or the gear box fails, the electric side pedal may be switched into the fixed side pedal, and the specific conditions are as follows:

Under the first situation when the rotating rod and the driven rotating rod rotate to enable the pedal to be in the extended state, the spare bolts reserved by the rotating rod on the driving support are rotated and taken down and aligned with the holes of the fixing rods, and then the rotating rod and the fixing rods are fixed by making the bolts pass through the holes.

Moreover, the spare bolts reserved by the driven rotating rod are rotated and taken down and aligned with the holes of the driven connecting members, and then the driven rotating rod and the driven connecting members are fixed by making the bolts pass through the holes.

Under the second situation when the rotating rod and the driven rotating rod rotate to enable the pedal to be in the retracted state, the spare bolts reserved by the rotating rod on the driving support are rotated and taken down and aligned with the holes of the fixing rods, and then the rotating rod and the fixing rods are fixed by making the bolts pass through the holes.

Moreover, the spare bolts reserved by the driven rotating rod are rotated and taken down and aligned with the holes of the driven connecting members, and then the driven rotating rod and the driven connecting members are fixed by making the bolts pass through the holes. Certainly, when the driving motor or the gear box is in a normal state, the electric side pedal may also be switched into the fixed side pedal.

2. The electric pedal for an automobile of the present invention has the advantage of being improved in bearing weight. The pedal of the present invention is tilted upwards by 0 to 5° so as to prevent a person getting on and off the automobile from slipping when treading the pedal. The angle between the lower supporting wall and the horizontal plane is 0 to 10°, such that the bearing weight of the pedal is improved. The smaller the angle between the lower supporting wall and the horizontal plane, the more the lower supporting wall tends to be parallel to a bottom of the automobile and the smoother operation of a mechanism; and the greater the moment to which the electric motor is applied, the greater power of the electric motor.

3. Compared with the prior art, the structure of the connecting end surface of the pedal is simpler, the machining cost is low, and assembling is simple.

4. Compared with the prior art, the present invention may effectively solve the problem of potential safety hazards caused by the fact that the automobile pedal touches an obstacle below a chassis during a retraction process.

Figure 1:
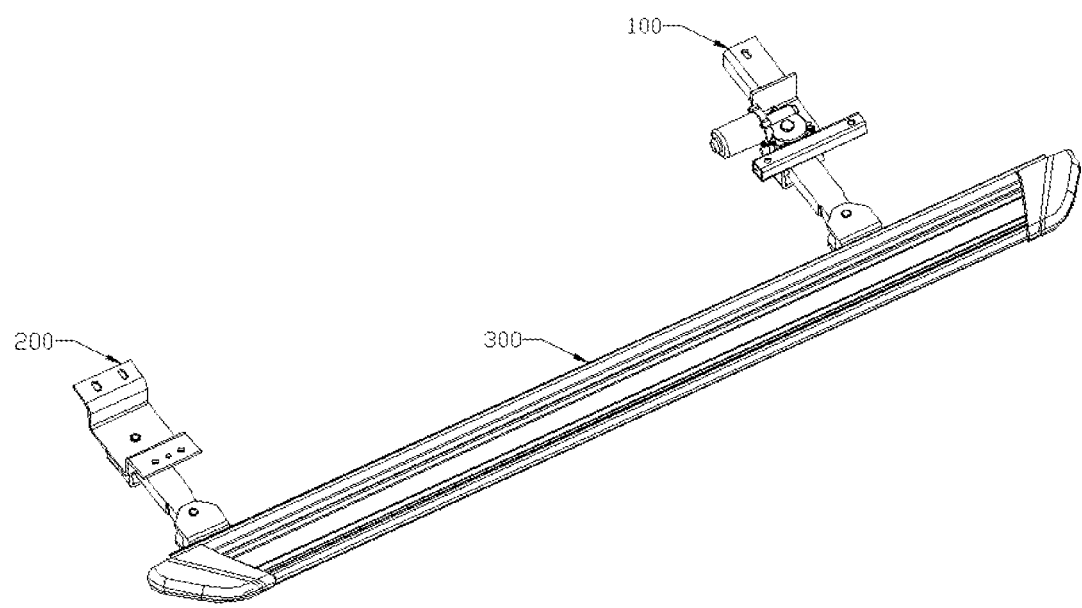
FIG. 1 shows the structure of the electric pedal for an automobile of the present invention in the extended state.

The reference numbers in the figures represent the following structures:

100—driving support; 110—first automobile connecting rod; 111—first connecting rod fixing hole; 120—driving motor; 130—second automobile connecting rod; 131—second connecting rod fixing hole; 132—fixing rod; 133—fixing plate; 140—gear box; 141—rotating rod; 142—driving shaft; 143—rotating rod supporting arm; 144—limiting block; 145—fixing arm; 146—fixing pin; 150—rotating mechanism; 151—rotating rod groove; 152—lower supporting wall; 153—upper supporting wall; 154—rotating rod rotating shaft; 155—connecting end surface; 156—connecting column; A1—first bolt; A2—first hole; A3—second hole; 200—driven support; 230—driven automobile fixing plate; 231—driven automobile fixing plate fixing hole; 232—driven connecting member; 241—driven rotating rod; 242—driven driving shaft; 243—driven rotating rod supporting arm; 244—driven limiting block; 245—driven fixing arm; 246—driven fixing pin; 250—driven rotating mechanism; 251—driven rotating rod groove; 252—driven lower supporting wall; 253—driven upper supporting wall; 254—driven rotating rod rotating shaft; 255—driven connecting end surface; 256—driven connecting column; B1—second bolt; B2—third hole; B3—fourth hole; and 300—pedal.

DETAILED DESCRIPTION OF THE EMBODIMENTS

With reference to FIGS. 1-10, the electric pedal for an automobile of the present invention is further described as follows. As shown in the figures, the electric pedal comprises at least one driving support 100, at least one driven support 200, and a pedal 300.

As shown in FIGS. 3-6, the driving support 100 comprises a first automobile connecting rod 110, a driving motor 120, a second automobile connecting rod 130, a gear box 140 and a rotating mechanism 150, where the first automobile connecting rod 110, the driving motor 120 and the second automobile connecting rod 130 are separately fixed to the automobile to which the electric pedal is mounted, the first automobile connecting rod 110 and the second automobile connecting rod 130 are separately and fixedly connected to the gear box 140, the gear box 140 is connected to the driving motor 120, and the driving motor 120 is fixed on the gear box 140. The rotating mechanism 150 is connected to the gear box 140 by means of a rotating rod 141, the rotating rod 141 is arranged below the second automobile connecting rod 130, and the rotating mechanism 150 is connected to the automobile pedal. The rotating mechanism 150 comprises a lower supporting wall 152 and an upper supporting wall 153, an angle between the lower supporting wall 152 and a horizontal plane is 0-10°, the end, away from the rotating rod 141, of the rotating mechanism 150 is provided with a connecting end surface 155, and an angle between the connecting end surface 155 and a vertical plane is set to 0-5°, such that the automobile pedal tilts towards a top of an automobile roof by 0-5°. The connecting end surface 155 is internally provided with a connecting column 156 fixed to the automobile pedal 300 in a matching manner, the connecting column 156 is vertically arranged in the connecting end surface 155, and the end, away from the rotating mechanism 150, of the rotating rod 141 is connected to the gear box 140 by means of a driving shaft 142. The lower end of the rotating rod 141 is provided with a rotating rod supporting arm 143, and the rotating rod supporting arm 143 and the rotating rod 141 are arranged in parallel. A front end of the rotating rod supporting arm 143 is provided with a fixing arm 145 perpendicular to the rotating rod 141, and one side of the rotating rod 141 protrudes outwards and is fixedly connected to the rotating rod supporting arm 143 by means of a fixing pin 146.

As shown in FIGS. 7-10, the driven support 200 comprises a driven automobile fixing plate 230 and a driven rotating mechanism 250, where one end of the driven automobile fixing plate 230 is fixed to the automobile to which the electric pedal is mounted, and the other end of the driven automobile fixing plate is fixedly connected to a driven connecting member 232. The driven rotating mechanism 250 is connected to the driven connecting member 232 by means of a driven rotating rod 241, the driven rotating rod 241 is arranged below the driven automobile fixing plate 230, and the driven rotating mechanism 250 is connected to the automobile pedal. The driven rotating mechanism 250 comprises a driven lower supporting wall 252 and a driven upper supporting wall 253, and an angle between the driven upper supporting wall 253 and a horizontal plane is set to 0-5°, such that the automobile pedal tilts towards the top of the automobile roof by 0-5°. An angle between the driven lower supporting wall 252 and the horizontal plane is 0-10°. The end, away from the driven rotating rod 241, of the driven rotating mechanism 250 is provided with a driven connecting end surface 255, the driven connecting end surface 255 is internally provided with a driven connecting column 256 fixed to the automobile pedal in a matching manner, the driven connecting column 256 is vertically arranged on the driven connecting end surface 255, and the end, away from the driven rotating mechanism 250, of the driven rotating rod 241 is connected to the driven connecting member 232 by means of a driven driving shaft 242. The lower end of the driven rotating rod 241 is provided with a driven rotating rod supporting arm 243, and the driven rotating rod supporting arm 243 and the driven rotating rod 241 are arranged in parallel. An edge of the driven rotating rod supporting arm 243 is provided with a driven fixing arm 245 perpendicular to the driven rotating rod 241, and one side of the driven rotating rod 241 protrudes outwards and is fixedly connected to the driven rotating rod supporting arm 243 by means of a driven fixing pin 246.

Figure 2:
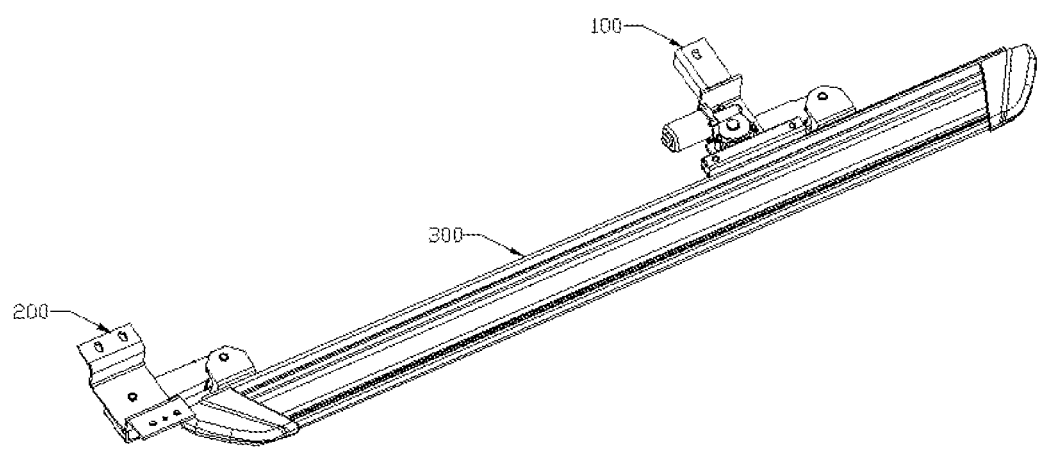
FIG. 2 shows the structure of the electric pedal for an automobile of the present invention in the retracted state.
Figure 3:
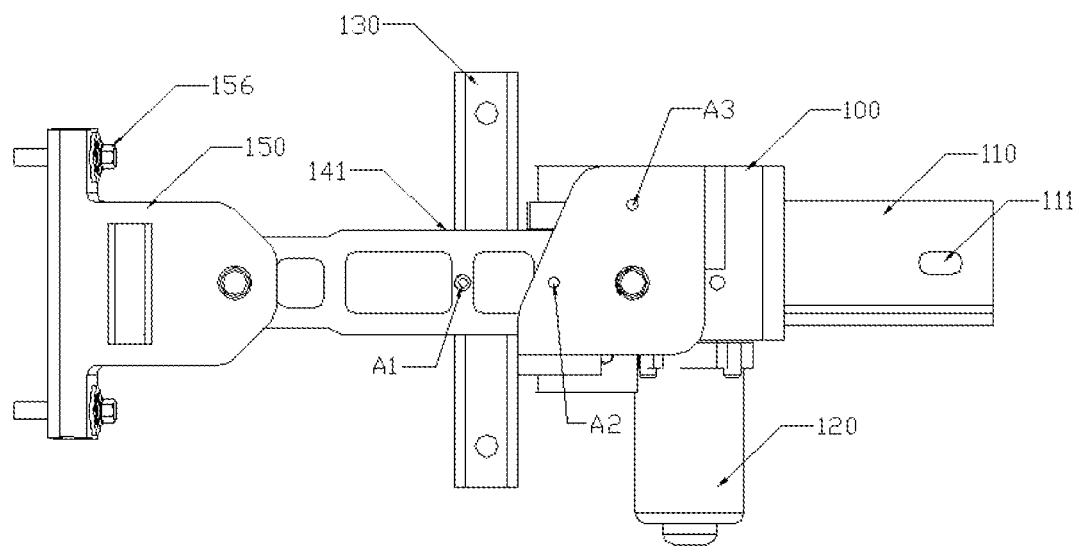
FIG. 3 shows the structure of the driving support in the present invention in the extended state of the pedal.
Figure 4:
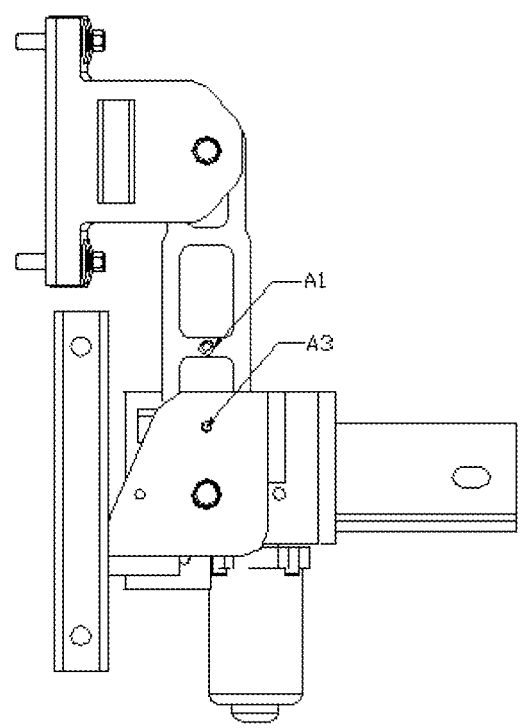
FIG. 4 shows the structure of the driving support in the present invention in the retracted state of the pedal.
Figure 5:
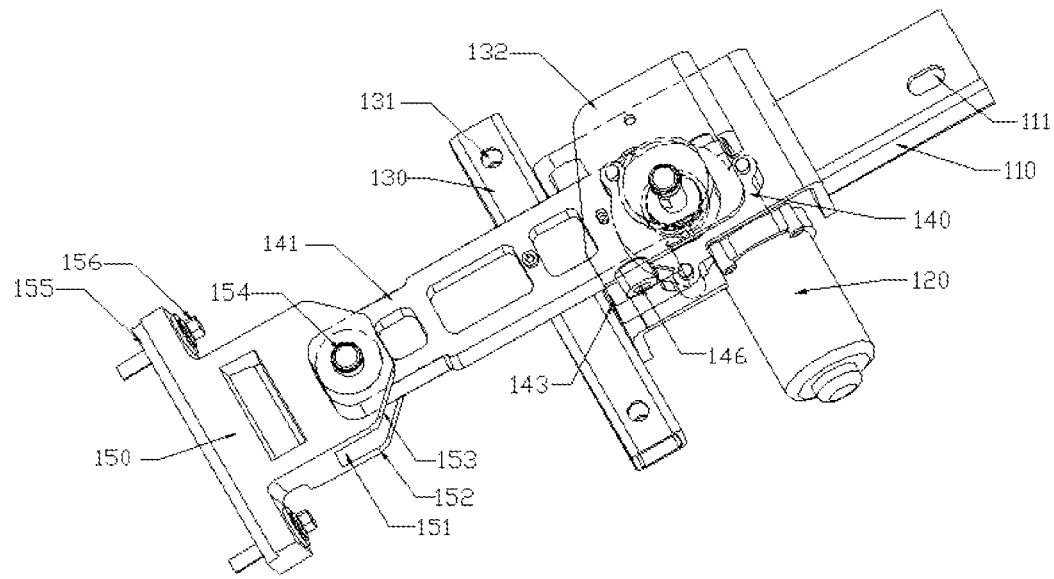
FIG. 5 shows the structure of the driving support in the present invention.
Figure 6:
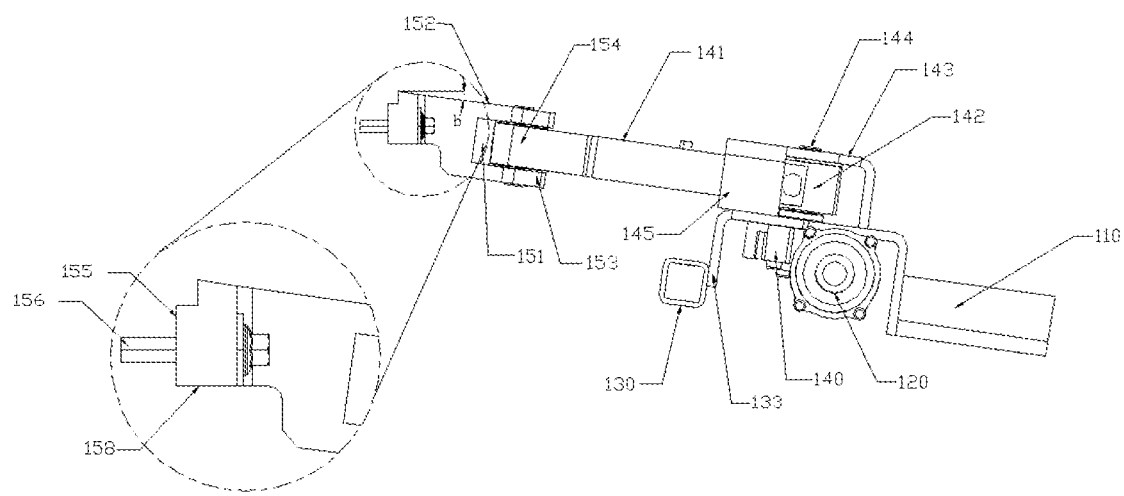
FIG. 6 shows the structure of the driving support in the present invention.

When the electric pedal for an automobile of the present invention is used, the driving support 100 drives the rotating rod 141 to rotate by means of the driving motor 120 and the gear box 140, such that the driving support 100 may be switched from the state of FIG. 3 to the state of FIG. 4. The driven support 200 may also be switched from the state of FIG. 7 to the state of FIG. 8 and switching from the state of FIG. 1 to the state of FIG. 2 is formed on the whole for the electric pedal for an automobile. The operation is simple and labor-saving.

In the present invention, the rotating mechanism 150 comprises the lower supporting wall 152 and the upper supporting wall 153, the upper supporting wall is horizontally arranged, the angle between the lower supporting wall 152 and the horizontal plane is 0-10°, and the inclined lower supporting wall may improve the stability of the rotating mechanism.

In the present invention, the connecting end surface 155 is arranged at the end, away from the rotating rod 141, of the rotating mechanism 150, the connecting column 156 fixed to the automobile pedal 300 in the matching manner is arranged in the connecting end surface 155, the connecting column 156 is vertically arranged in the connecting end surface 155, and the connecting end surface 155 cooperates with the connecting column 156 to stably fix the pedal 300 on the driving support 100. Secondary supporting for the rotating rod 141 is achieved by means of the rotating rod supporting arm 143, such that supporting of the rotating rod is firmer, and the durability of use is improved. Fixing arm 145 perpendicular to the rotating rod 141 makes pressure applied to the rotating rod 141 perpendicular to the rotating rod supporting arm 143, and a supporting effect is better. Moreover, the driving motor 120 drives the rotating rod 141 to rotate in a horizontal direction to enable the rotating mechanism 150 to rotate in the horizontal direction, such that the problem of potential safety hazards caused by the fact that the automobile pedal 300 touches an obstacle below a chassis in a retraction process may be effectively solved.

In the present invention, the end, close to the rotating rod 141, of the rotating mechanism 150 is provided with the upper supporting wall 153 and the lower supporting wall 152, and the upper supporting wall 153 and the lower supporting wall 152 are arranged in parallel. The upper supporting wall 153 and the lower supporting wall 152 form a rotating rod groove 151, a rotating rod rotating shaft 154 is arranged in the rotating rod groove 151, and the rotating rod rotating shaft 154 is connected to the rotating rod 141.

In the present invention, the end, close to the driven rotating rod 241, of the driven rotating mechanism 250 is provided with the driven upper supporting wall 253 and the driven lower supporting wall 252, and the driven upper supporting wall 253 and the driven lower supporting wall 252 are arranged in parallel. The driven upper supporting wall 253 and the driven lower supporting wall 252 form a driven rotating rod groove 251, a driven rotating rod rotating shaft 254 is arranged in the driven rotating rod groove 251, and the driven rotating rod rotating shaft 254 is connected to the driven rotating rod 241.

In the present invention, the rotating rod 141 is obliquely arranged downwards, and an angle between the rotating rod 141 and the horizontal plane is 0-10°.

In the present invention, the driven rotating rod 241 is obliquely arranged downwards, and an angle between the driven rotating rod 241 and the horizontal plane is 0-10°.

In the present invention, the end, away from the rotating rod 141, of the rotating mechanism 150 is provided with the connecting end surface 155, the connecting end surface 155 is internally provided with the connecting column 156 fixed to the automobile pedal in the matching manner, and the connecting column 156 is vertically arranged in the connecting end surface 155.

In the present invention, the end, away from the driven rotating rod 241, of the driven rotating mechanism 250 is provided with the driven connecting end surface 255, the driven connecting end surface 255 is internally provided with the driven connecting column 256 fixed to the automobile pedal in the matching manner, and the driven connecting column 256 is vertically arranged on the driven connecting end surface 255.

As shown in FIGS. 3-6, in the present invention, the second automobile connecting rod 130 is fixedly connected to the gear box 140 by means of fixing rods 132, and at least two the fixing rods 132 are arranged and parallel to each other; and the second automobile connecting rod 130 is fixedly connected to a fixing plate 133 and the fixing rods 132 in a welded manner, and at least two the fixing rods 132 are arranged and parallel to each other.

As shown in FIGS. 7-10, in the present invention, the driven automobile fixing plate 230 is provided with the driven connecting members 232, the driven automobile fixing plate 230 is fixedly connected to the driven connecting members 232 in a welded manner, and at least two driven connecting members 232 are arranged and parallel to each other.

In the present invention, the electric pedal for an automobile may be switched into a fixed side pedal, and in this case, the driving motor 120 needs to be stopped, or the driving motor 120 or the gear box 140 fails.

Figure 7:
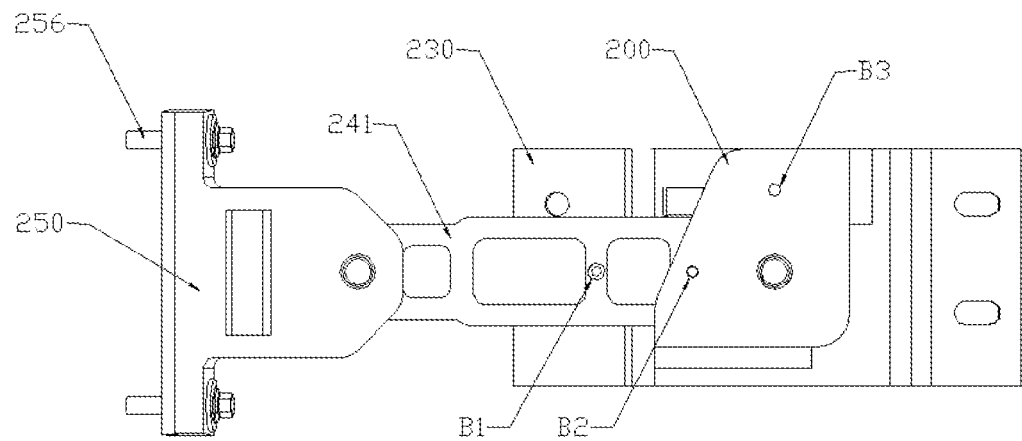
FIG. 7 shows the structure of the driven support in the present invention in the extended state of the pedal.

Under the first situation as shown in FIGS. 1, 3 and 7, when the rotating rod 141 and the driven rotating rod 241 rotate to enable the pedal 300 to be in an extended state, first bolts A1 reserved by the rotating rod 141 on the driving support are rotated and taken down and aligned with first holes A2 of the fixing rods 132, and then the rotating rod 141 and the fixing rods 132 are fixed by making the first bolts A1 pass through the first holes A2.

Moreover, second bolts B1 reserved by the driven rotating rod 241 are rotated and taken down and aligned with third holes B2 of the driven connecting members 232, and then the driven rotating rod 241 and the driven connecting members 232 are fixed by making the second bolts B1 pass through the third holes B2.

Figure 8:
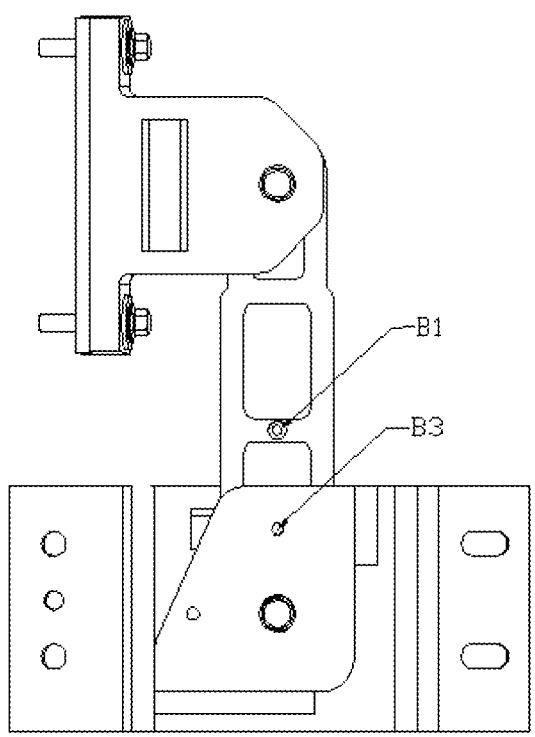
FIG. 8 shows the structure of the driven support in the present invention in the retracted state of the pedal.
Figure 9:
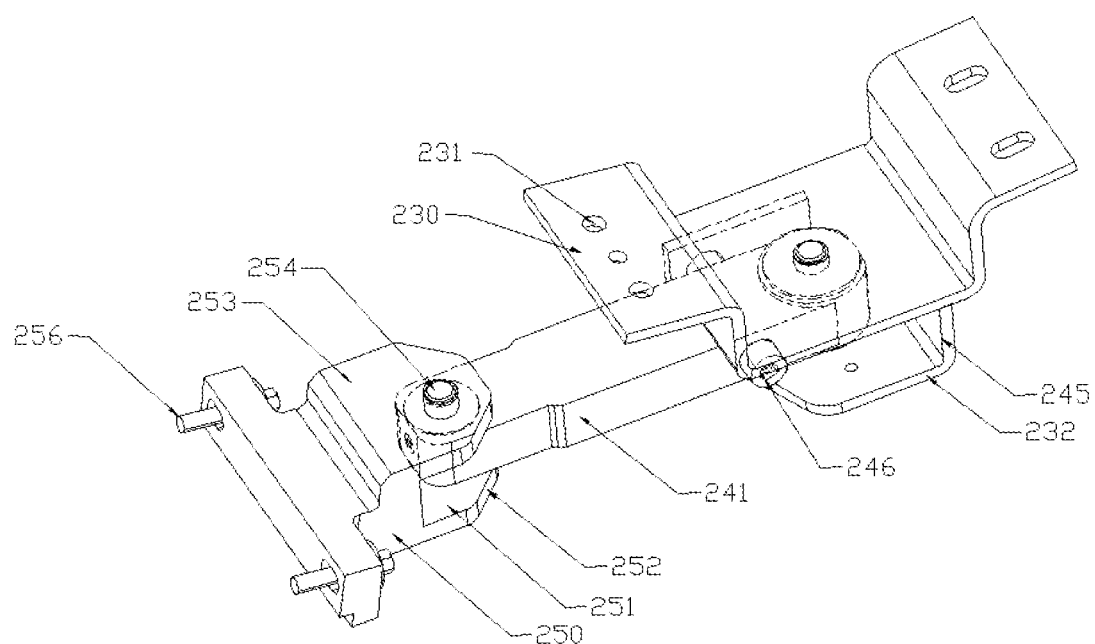
FIG. 9 shows the structure of the driven support in the present invention.
Figure 10:
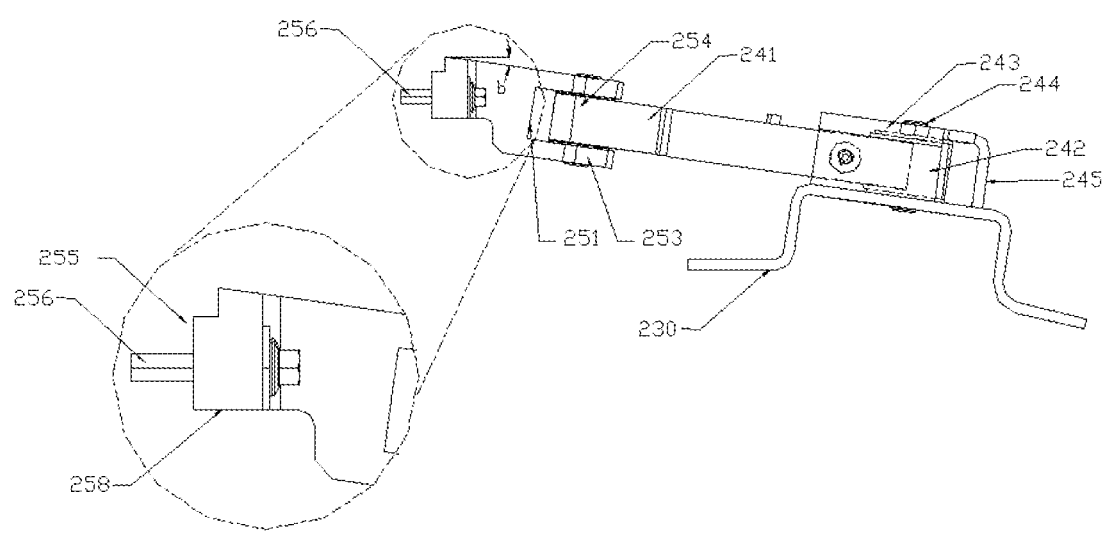
FIG. 10 shows the structure of the driven support in the present invention.

Under the second situation as shown in FIGS. 2, 4, and 8, when the rotating rod 141 and the driven rotating rod 241 rotate to enable the pedal 300 to be in a retracted state, the first bolts A1 reserved by the rotating rod 141 on the driving support are rotated and taken down and aligned with second holes A3 of the fixing rods 132, and then the rotating rod 141 and the fixing rods 132 are fixed by making the first bolts A1 pass through the second holes A3.

Moreover, the second bolts B1 reserved by the driven rotating rod 241 are rotated and taken down and aligned with fourth holes B3 of the driven connecting members 232, and then the driven rotating rod 241 and the driven connecting members 232 are fixed by making the second bolts B1 pass through the fourth holes B3.

In the present invention, the end, away from the gear box 140, of the driving shaft 142 is provided with a limiting block 144 and the rotating rod supporting arm 143, and the limiting block 144 is arranged at the end, away from the gear box 140, of the rotating rod supporting arm 143. The end, away from the driven connecting member 232, of the driven driving shaft 242 is provided with a driven limiting block 244 and a driven rotating rod supporting arm 243, and the driven limiting block 244 is arranged at the end, away from the driven connecting member 232, of the driven rotating rod supporting arm 243.

In the present invention, the rotating rod supporting arm 143 is fixedly connected to the end, away from the second automobile connecting rod 130, of the rotating rod 141, and the rotating rod supporting arm 143 and the rotating rod 141 jointly rotate synchronously by taking the driving shaft 142 as a rotating shaft. The driven rotating rod supporting arm 243 is fixedly connected to the end, away from the driven automobile fixing plate 230, of the driven rotating rod 241, and the driven rotating rod supporting arm 243 and the driven rotating rod 241 jointly rotate synchronously by taking the driven driving shaft 242 as a rotating shaft.

In the present invention, the first automobile connecting rod 110 and the second automobile connecting rod 130 are perpendicular to each other, the first automobile connecting rod 110 is provided with a first connecting rod fixing hole 111, the second automobile connecting rod 130 is provided with two second connecting rod fixing holes 131, and the driven automobile fixing plate 230 is provided with a driven automobile fixing plate fixing hole 231.

The above-mentioned contents are merely preferred examples of the present invention and are not intended to limit the implementation scope of the present invention, that is, all equivalent changes and modifications made according to the contents of the patent scope of the present invention shall fall within the technical scope of the present invention.

The electric pedal for an automobile of the present invention comprises a driving support, a driven support, and a pedal. The driving support comprises a first automobile connecting rod, a driving motor, a second automobile connecting rod, a gear box, and a rotating mechanism. The first automobile connecting rod, the driving motor, and the second automobile connecting rod are separately fixed to the automobile to which the electric pedal is mounted, and the driven support comprises a driven automobile fixing plate and a driven rotating mechanism. The electric pedal for an automobile can be switched into a fixed side pedal, and in this case, the driving motor needs to be stopped, or the driving motor or the gear box fails. When the rotating rod and the driven rotating rod rotate to enable the pedal to be in an extended state or a retracted state, first bolts reserved by the rotating rod on the driving support are rotated and taken down and aligned with holes of fixing rods, and then the rotating rod and the fixing rods are fixed by making the first bolts pass through the holes. Moreover, second bolts reserved by the driven rotating rod are rotated and taken down and aligned with holes of driven connecting members, and then the driven rotating rod and the driven connecting members are fixed by making the second bolts pass through the holes. Therefore, the electric pedal for an automobile of the present invention has the advantages of being improved in bearing weight, capable of being freely switched into the fixed side pedal, etc.

We claim:

1. An electric pedal for an automobile, comprising
   a driving support (100),
   a driven support (200), and
   an automobile pedal (300),
   wherein the driving support (100) comprises
     a first automobile connecting rod (110),
     a driving motor (120),
     a second automobile connecting rod (130),
     a gear box (140), and
     a rotating mechanism (150);
   the first automobile connecting rod (110), the driving motor (120), and the second automobile connecting rod (130) are separately fixed to the automobile to which the electric pedal is mounted;
   the first automobile connecting rod (110) and the second automobile connecting rod (130) are separately and fixedly connected to the gear box (140);
   the gear box (140) is connected to the driving motor (120), and the driving motor (120) is fixed on the gear box (140);
   the rotating mechanism (150) is connected to the gear box (140) by a rotating rod (141), the rotating rod (141) is arranged below the second automobile connecting rod (130),
   the rotating mechanism (150) is connected to the automobile pedal (300),
   the rotating mechanism (150) comprises
     a lower supporting wall (152), and
     an upper supporting wall (153),
   an angle between the lower supporting wall (152) and a horizontal plane is 0 to 10°,
   one end, away from the rotating rod (141), of the rotating mechanism (150) is provided with a connecting end surface (155), an angle between the connecting end surface (155) and a vertical plane is set to 0 to 5° such that the automobile pedal (300) tilts towards a top of an automobile roof by 0 to 5°,
   the connecting end surface (155) is internally provided with a connecting column (156) fixed to the automobile pedal (300) in a matching manner, and the connecting column (156) is vertically arranged in the connecting end surface (155),
   one end, away from the rotating mechanism (150), of the rotating rod (141) is connected to the gear box (140) by a driving shaft (142), a lower end of the rotating rod (141) is provided with a rotating rod supporting arm (143), the rotating rod supporting arm (143) and the rotating rod (141) are arranged in parallel,
a front end of the rotating rod supporting arm (143) is provided with a fixing arm (145) perpendicular to the rotating rod (141), and one side of the rotating rod (141) protrudes outwards and is fixedly connected to the rotating rod supporting arm (143) by means of a fixing pin (146);
the driven support (200) comprises
a driven automobile fixing plate (230), and
a driven rotating mechanism (250),
one end of the driven automobile fixing plate (230) is fixed to the automobile to which the electric pedal is mounted, another end of the driven automobile fixing plate is fixedly connected to a driven connecting member (232),
the driven rotating mechanism (250) is connected to the driven connecting member (232) by a driven rotating rod (241), the driven rotating rod (241) is arranged below the driven automobile fixing plate (230),
the driven rotating mechanism (250) is connected to the automobile pedal (300),
the driven rotating mechanism (250) comprises
a driven lower supporting wall (252), and
a driven upper supporting wall (253),
an angle between the driven upper supporting wall (253) and a horizontal plane is set to 0 to 5° such that the automobile pedal (300) tilts towards the top of the automobile roof by 0 to 5°,
an angle between the driven lower supporting wall (252) and the horizontal plane is 0 to 10°,
one end, away from the driven rotating rod (241), of the driven rotating mechanism (250) is provided with a driven connecting end surface (255), the driven connecting end surface (255) is internally provided with a driven connecting column (256) fixed to the automobile pedal (300) in a matching manner, the driven connecting column (256) is vertically arranged on the driven connecting end surface (255),
one end, away from the driven rotating mechanism (250), of the driven rotating rod (241) is connected to the driven connecting member (232) by a driven driving shaft (242), a lower end of the driven rotating rod (241) is provided with a driven rotating rod supporting arm (243),
the driven rotating rod supporting arm (243) and the driven rotating rod (241) are arranged in parallel, an edge of the driven rotating rod supporting arm (243) is provided with a driven fixing arm (245) perpendicular to the driven rotating rod (241), and one side of the driven rotating rod (241) protrudes outwards and is fixedly connected to the driven rotating rod supporting arm (243) by a driven fixing pin (246);
the second automobile connecting rod (130) is fixedly connected to the gear box (140) by fixing rods (132), and at least two fixing rods (132) are arranged and in parallel to each other;
the second automobile connecting rod (130) is fixedly connected to a fixing plate (133) and the fixing rods (132) in a welded manner, and at least two fixing rods (132) are arranged and in parallel to each other;
the driven automobile fixing plate (230) is provided with the driven connecting members (232), the driven automobile fixing plate (230) is fixedly connected to the driven connecting members (232) in a welded manner, and at least two driven connecting members (232) are arranged and in parallel to each other;
when the electric pedal for an automobile is switched into a fixed side pedal, the driving motor (120) is to be switched off, or the driving motor (120) or the gear box (140) fails;
wherein under a first situation when the rotating rod (141) and the driven rotating rod (241) rotate to enable the pedal (300) to reach an extended state, first bolts (A1) reserved for the rotating rod (141) on the driving support are rotated, taken down and aligned with first holes (A2) of the fixing rods (132), and then the rotating rod (141) and the fixing rods (132) are fixed by making the first bolts (A1) pass through the first holes (A2); second bolts (B1) reserved for the driven rotating rod (241) are rotated and, taken down and aligned with third holes (B2) of the driven connecting members (232), and then the driven rotating rod (241) and the driven connecting members (232) are fixed by making the second bolts (B1) pass through the third holes (B2);
wherein under a second situation when the rotating rod (141) and the driven rotating rod (241) rotate to enable the pedal (300) to reach a retracted state, the first bolts (A1) reserved for the rotating rod (141) on the driving support are rotated, taken down and aligned with second holes (A3) of the fixing rods (132), and then the rotating rod (141) and the fixing rods (132) are fixed by making the first bolts (A1) pass through the second holes (A3); and the second bolts (B1) reserved for the driven rotating rod (241) are rotated, taken down and aligned with fourth holes (B3) of the driven connecting members (232), and then the driven rotating rod (241) and the driven connecting members (232) are fixed by making the second bolts (B1) pass through the fourth holes (B3).

2. The electric pedal for an automobile according to claim 1, wherein
the end, close to the rotating rod (141), of the rotating mechanism (150) is provided with the upper supporting wall (153) and the lower supporting wall (152), the upper supporting wall (153) and the lower supporting wall (152) are arranged in parallel, the upper supporting wall (153) and the lower supporting wall (152) form a rotating rod groove (151), a rotating rod rotating shaft (154) is arranged in the rotating rod groove (151), and the rotating rod rotating shaft (154) is connected to the rotating rod (141); and
the end, close to the driven rotating rod (241), of the driven rotating mechanism (250) is provided with the driven upper supporting wall (253) and the driven lower supporting wall (252), the driven upper supporting wall (253) and the driven lower supporting wall (252) are arranged in parallel, the driven upper supporting wall (253) and the driven lower supporting wall (252) form a driven rotating rod groove (251), a driven rotating rod rotating shaft (254) is arranged in the driven rotating rod groove (251), and the driven rotating rod rotating shaft (254) is connected to the driven rotating rod (241).

3. The electric pedal for an automobile according to claim 1, wherein
the rotating rod (141) is obliquely arranged downwards, and an angle between the rotating rod (141) and the horizontal plane is 0 to 10°; and
the driven rotating rod (241) is obliquely arranged downwards, and an angle between the driven rotating rod (241) and the horizontal plane is 0 to 10°.

4. The electric pedal for an automobile according to claim 1, wherein the end, away from the rotating rod (141), of the rotating mechanism (150) is provided with the connecting end surface (155), the connecting end surface (155) is internally provided with the connecting column (156) fixed to the automobile pedal in the matching manner, and the connecting column (156) is vertically arranged in the connecting end surface (155); and the end, away from the driven rotating rod (241), of the driven rotating mechanism (250) is provided with the driven connecting end surface (255), the driven connecting end surface (255) is internally provided with the driven connecting column (256) fixed to the automobile pedal in the matching manner, and the driven connecting column (256) is vertically arranged on the driven connecting end surface (255).

5. The electric pedal for an automobile according to claim 1, wherein the end, away from the gear box (140), of the driving shaft (142) is provided with a limiting block (144) and the rotating rod supporting arm (143), and the limiting block (144) is arranged at the end, away from the gear box (140), of the rotating rod supporting arm (143); and the end, away from the driven connecting member (232), of the driven driving shaft (242) is provided with a driven limiting block (244) and a driven rotating rod supporting arm (243), and the driven limiting block (244) is arranged at the end, away from the driven connecting member (232), of the driven rotating rod supporting arm (243).

6. The electric pedal for an automobile according to claim 1, wherein the rotating rod supporting arm (143) is fixedly connected to the end, away from the second automobile connecting rod (130), of the rotating rod (141), and the rotating rod supporting arm (143) and the rotating rod (141) jointly rotate synchronously by taking the driving shaft (142) as a rotating shaft; and the driven rotating rod supporting arm (243) is fixedly connected to the end, away from the driven automobile fixing plate (230), of the driven rotating rod (241), and the driven rotating rod supporting arm (243) and the driven rotating rod (241) jointly rotate synchronously by taking the driven driving shaft (242) as a rotating shaft.

7. The electric pedal for an automobile according to claim 1, wherein the first automobile connecting rod (110) and the second automobile connecting rod (130) are perpendicular to each other, the first automobile connecting rod (110) is provided with a first connecting rod fixing hole (111), and the second automobile connecting rod (130) is provided with two second connecting rod fixing holes (131); and the driven automobile fixing plate (230) is provided with a driven automobile fixing plate fixing hole (231).

* * * * *